March 18, 1924.

J. M. AHLGREN

CONTAINER

Filed March 24, 1923

1,487,424

Inventor
JOHN M. AHLGREN

Patented Mar. 18, 1924.                                                                      1,487,424

UNITED STATES PATENT OFFICE.

JOHN M. AHLGREN, OF INDIANAPOLIS, INDIANA, ASSIGNOR TO AHLBELL BATTERY CONTAINER CORPORATION, OF WAUKEGAN, ILLINOIS, A CORPORATION OF ILLINOIS.

CONTAINER.

Original application filed April 28, 1922, Serial No. 557,131. Divided and this application filed March 24, 1923. Serial No. 627,424.

*To all whom it may concern:*

Be it known that I, JOHN M. AHLGREN, a citizen of the United States, residing at Indianapolis, in the county of Marion and State of Indiana, have invented a new and useful Improvement in Containers, of which the following is a specification.

My invention relates, more particularly, though not exclusively, to battery containers of a form and construction to receive the battery elements of a plural cell battery as, for example and more particularly, storage batteries such as are used in automobiles and which containers are, by preference, formed of any suitable vulcanized rubber compound; this application being a division of my application for United States Letters Patent Serial No. 557,131 filed April 28, 1922.

My object is to provide a highly satisfactory and durable construction of container which shall be of neat and attractive appearance, shall be leak-proof, and shall be especially adapted for use in automobiles.

Figure 1:
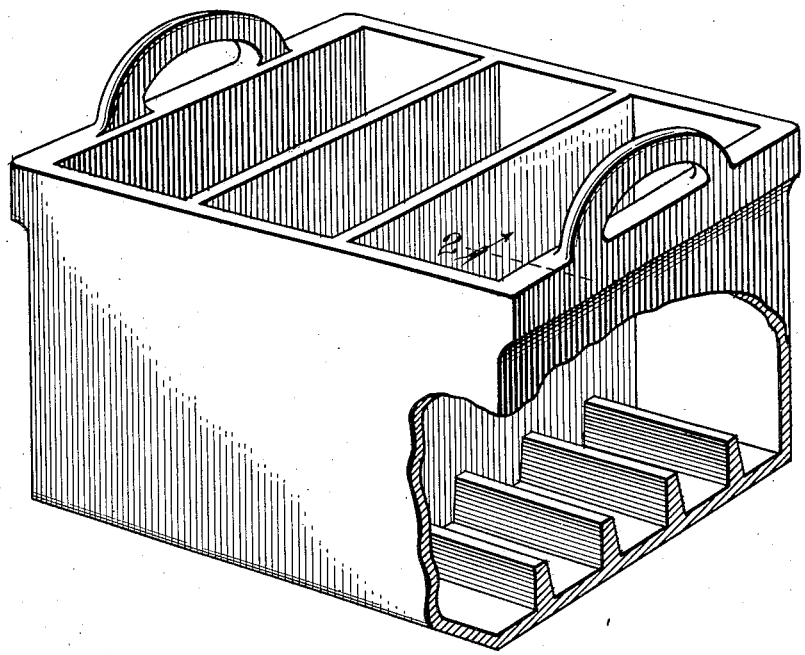
Figure 2:

Referring to the accompanying drawings:

Figure 1 is a perspective view of my improved container, a portion thereof being broken away; and Figure 2 an enlarged, broken, section taken at the line 2 on Fig. 1 and viewed in the direction of the arrow.

The container illustrated and which is preferably made of any suitable vulcanized rubber compound, is shown of a form suitable for forming the cell-equipped container of a storage battery, the container being shown as presenting three cell compartments for receiving the battery elements. The container shown is of general rectangular shape and comprises the side walls 3, end walls 4, bottom wall 5 and cell-forming partitions 6 shown as extending substantially parallel with each other, and with the end walls 4. The upper surfaces of the end and side walls are shown as extending in the same plane, the end walls being provided with handle portions 7 extending upwardly therefrom and extending laterally outward from the body portions of the end walls, the inner surfaces of these handle portions, these surfaces being represented at 8, extending preferably substantially in the plane of the outer surfaces of the end walls, the body of material at the upper edge portions of the end walls 4 being of increased thickness, as compared with the lower portions of the end walls and forming ribs 9 at the outer surfaces of these end walls adjacent their upper ends. The ribs referred to and which preferably extend the full width of the container, cause the latter to present, at the juncture of the handle portions 8 with the upper edge portions of the end walls 4, sufficient bodies of material to prevent the handle portions from breaking away from the walls carrying them.

The various described parts of the container are preferably integral, and when the container, including the handle portions, is formed of vulcanized rubber compound, the material forming these several parts is preferably vulcanized into a solid integral mass.

The container may be formed in any desirable way. When it is formed of vulcanizable rubber compound, it may be, and preferably is, formed with the apparatus, and in the manner, set forth in my above-referred-to application for Letters Patent, which results in the production of the container as an integral structure of vulcanized rubber compound.

While I have illustrated and described a particular form of container and referred to the producing of the same by the employment of a particular method and apparatus, I do not wish to be understood as intending to limit it thereto as the form may be variously modified and altered, and the structure produced by other methods and apparatus, without departing from the spirit of my invention.

What I claim as new, and desire to secure by Letters Patent, is:

1. A container formed as a one piece boxlike structure presenting a continuous upper edge, one wall of said container being thickened to form a reinforcing rib, and a handle member rising from the top of said wall in such a position as to leave an unobstructed shoulder on the inner side of said handle.

2. A container formed as a one piece boxlike structure presenting a continuous unobstructed upper edge, with handle supporting ribs at the outer surfaces of the upper end portions of opposed walls thereof, and handle portions extending upwardly from the outer surfaces of said ribs and laterally outwardly beyond the upper edges of said walls, all of said parts being integral.

JOHN M. AHLGREN.